US012647983B2

(12) United States Patent
Fakoorian et al.

(10) Patent No.: US 12,647,983 B2
(45) Date of Patent: Jun. 2, 2026

(54) USER EQUIPMENT AGGREGATION FOR UPLINK COMMUNICATIONS

(71) Applicant: Apple Inc., Cupertino, CA (US)

(72) Inventors: Seyed Ali Akbar Fakoorian, San Diego, CA (US); Yushu Zhang, Beijing (CN); Chunxuan Ye, San Diego, CA (US); Dawei Zhang, Saratoga, CA (US); Haijing Hu, Los Gatos, CA (US); Haitong Sun, Cupertino, CA (US); Hong He, San Jose, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 559 days.

(21) Appl. No.: 17/802,811

(22) PCT Filed: Sep. 24, 2021

(86) PCT No.: PCT/CN2021/120496
§ 371 (c)(1),
(2) Date: Aug. 26, 2022

(87) PCT Pub. No.: WO2023/044826
PCT Pub. Date: Mar. 30, 2023

(65) Prior Publication Data
US 2024/0205923 A1 Jun. 20, 2024

(51) Int. Cl.
| | |
|---|---|
| *H04W 72/21* | (2023.01) |
| *H04W 72/232* | (2023.01) |
| *H04W 72/25* | (2023.01) |

(52) U.S. Cl.
CPC ......... *H04W 72/21* (2023.01); *H04W 72/232* (2023.01); *H04W 72/25* (2023.01)

(58) Field of Classification Search
CPC ... H04W 72/21; H04W 72/232; H04W 72/25; H04W 88/04; H04W 92/18
See application file for complete search history.

(56) References Cited

U.S. PATENT DOCUMENTS

| | | | |
|---|---|---|---|
| 2016/0286374 A1* | 9/2016 | Baghel | H04W 8/005 |
| 2018/0054237 A1* | 2/2018 | Tseng | H04W 36/0022 |
| 2018/0324882 A1 | 11/2018 | Gulati et al. | |
| 2019/0342921 A1 | 11/2019 | Loehr et al. | |
| 2020/0053767 A1 | 2/2020 | Bai et al. | |

(Continued)

FOREIGN PATENT DOCUMENTS

| | | |
|---|---|---|
| CN | 106576354 A | 4/2017 |
| CN | 108702751 A | 10/2018 |

(Continued)

OTHER PUBLICATIONS

International Patent Application No. PCT/CN2021/120389, International Preliminary Report on Patentability, Apr. 4, 2024, 6 pages.

(Continued)

*Primary Examiner* — Tejis Daya
(74) *Attorney, Agent, or Firm* — Kilpatrick Townsend & Stockton LLP

(57) ABSTRACT

The present application relates to devices and components including apparatus, systems, and methods for UE aggregation for uplink communications in wireless networks.

17 Claims, 10 Drawing Sheets

(56) References Cited

U.S. PATENT DOCUMENTS

| | | | |
|---|---|---|---|
| 2020/0154490 A1 | 5/2020 | Xiang et al. | |
| 2020/0260231 A1* | 8/2020 | Ganesan | H04L 1/1825 |
| 2020/0267751 A1 | 8/2020 | Shi et al. | |
| 2020/0305165 A1* | 9/2020 | Inokuchi | H04W 88/04 |
| 2020/0337021 A1 | 10/2020 | Zhang et al. | |
| 2020/0383136 A1 | 12/2020 | Xie et al. | |
| 2021/0135796 A1 | 5/2021 | Fong et al. | |
| 2021/0153238 A1 | 5/2021 | Zhou et al. | |
| 2021/0195573 A1 | 6/2021 | Wang et al. | |
| 2021/0219110 A1* | 7/2021 | Kousaridas | H04W 4/70 |
| 2021/0266136 A1 | 8/2021 | Baldemair et al. | |
| 2021/0289419 A1* | 9/2021 | Hosseini | H04L 5/0091 |
| 2021/0328725 A1 | 10/2021 | Jassal et al. | |
| 2021/0385714 A1* | 12/2021 | Paladugu | H04W 36/0009 |
| 2022/0312377 A1 | 9/2022 | Takeda et al. | |
| 2023/0246756 A1 | 8/2023 | Khoshnevisan et al. | |
| 2023/0246760 A1 | 8/2023 | Khoshnevisan et al. | |
| 2023/0262700 A1* | 8/2023 | Liu | H04W 72/232 370/329 |
| 2023/0276514 A1* | 8/2023 | Basu Mallick | H04L 1/1819 370/328 |
| 2024/0120987 A1 | 4/2024 | Yuan et al. | |
| 2024/0237029 A1* | 7/2024 | Fakoorian | H04L 1/1864 |
| 2024/0244635 A1 | 7/2024 | Yuan et al. | |
| 2024/0340149 A1 | 10/2024 | Lei | |

FOREIGN PATENT DOCUMENTS

| | | | |
|---|---|---|---|
| CN | 109792778 A | 5/2019 | |
| CN | 109863809 A | 6/2019 | |
| CN | 110099423 A | 8/2019 | |
| CN | 110290592 A | 9/2019 | |
| CN | 110603892 A | 12/2019 | |
| CN | 110832926 A | 2/2020 | |
| CN | 111901847 A | 11/2020 | |
| CN | 112042141 A | 12/2020 | |
| WO | 2018095297 A1 | 5/2018 | |
| WO | 2021109013 A1 | 6/2021 | |
| WO | WO-2023280978 A2 * | 1/2023 | H04L 1/22 |

OTHER PUBLICATIONS

International Patent Application No. PCT/CN2021/120496, International Preliminary Report on Patentability, Apr. 4, 2024, 5 pages.

Considerations on Resource Allocation for UE-to-Network Relays, 3GPP TSG RAN WG1 Meeting #82, ITL Inc., R1-154548, Aug. 28, 2015, 4 pages.

International Patent Application No. PCT/CN2021/120496, International Search Report and Written Opinion, Mailed on Jun. 23, 2022, 9 pages.

Discussion on Network Assisted UE Cooperation for Rel-17, Huawei, HiSilicon, 3GPP TSG RAN Meeting #83, RP-190491, Mar. 18-21, 2019, 2 pages.

International Patent Application No. PCT/CN2021/120389, International Search Report and Written Opinion, Mailed on Jun. 21, 2022, 9 pages.

Study on UE Aggregation for Industry with Multi-connectivity, Vivo, Aug. 19, 2021, 8 pages.

3rd Generation Partnership Project; Technical Specification Group Radio Access Network; NR; Multiplexing and channel coding (Release 16), 3GPP TS 38.212 V16.6.0, Jun. 2021, 153 pages.

3rd Generation Partnership Project; Technical Specification Group Radio Access Network; NR; Physical layer procedures for control (Release 16), 3GPP TS 38.213 V16.6.0, Jun. 2021, 187 pages.

3rd Generation Partnership Project; Technical Specification Group Radio Access Network; NR; Physical layer procedures for data (Release 16), 3GPP TS 38.214 V16.6.0, Jun. 2021, 173 pages.

3rd Generation Partnership Project; Technical Specification Group Radio Access Network; NR; Radio Resource Control (RRC) protocol specification (Release 16), 3GPP TS 38.331 V16.5.0, Jun. 2021, 959 pages.

Enhanced support for personal IOT network in Rel 18, Vivo, 3GPP TSG RAN Rel-18 workshop, RWS-210172, Jun. 28-Jul. 2, 2021, 6 pages.

Motivation of study for UE Aggregation, CMCC, 3GPP TSG RAN Rel-18 workshop, RWS-210355, Jun. 28-Jul. 2, 2021, 5 pages.

UE Aggregation, Huawei, HiSilicon, 3GPP TSG RAN Meeting #92-e, RWS-210451, Jun. 14-18, 2021, 3 pages.

Uplink Enhancements for 5G Advanced, ZTE, Sanechips, 3GPP TSG RAN Rel-18 workshop, RWS-210479, Jun. 28-Jul. 2, 2021, 10 pages.

InterDigital's Views on Rel-18 Scope for NR-Advanced, InterDigital, 3GPP TSG RAN Rel-18 Workshop, RWS-210422, Jun. 28-Jul. 2, 2021, 17 pages.

Views on UL Enhancements in Rel-18, FGI, Asia Pacific Telecom, 3GPP TSG RAN Rel-18 workshop, RWS-210192, Jun. 28-Jul. 2, 2021, 6 pages.

Uplink Enhancements, Rakuten Mobile, 3GPP TSG RAN Rel-18 workshop, RWS-210199, Jun. 28-Jul. 2, 2021, 6 pages.

Addition of sTTI Related Definitions, Symbols and Abbreviations to TS 36.521-1, Huawei, HiSilicon, 3rd Generation Partnership Project Technical Specification Group-Radio Access Network 5, Meeting #88-e, R5-203927, Aug. 17-28, 2020, 8 pages.

U.S. Appl. No. 17/802,136, Non-Final Office Action, Oct. 23, 2024, 39 pages.

China Patent Application No. 202180019328.6, Notice of Decision to Grant, Dec. 6, 2024, 8 pages.

China Patent Application No. 202180019328.6, Office Action, Jul. 18, 2024, 12 pages.

China Patent Application No. 202180019526.2, Notice of Decision to Grant, Aug. 19, 2025, 7 pages.

Resource Allocation Mechanism, 3rd Generation Partnership Project Technical Specification Group Radio Access Network Working Group 1, Meeting #95, R1-1812872, Nov. 12-16, 2018, 11 pages.

U.S. Appl. No. 17/802,136, Final Office Action, Mar. 28, 2025, 37 pages.

China Patent Application No. 202180019526.2, Office Action, Mar. 13, 2025, 14 pages.

* cited by examiner

700

Receiving configuration information from target
UE
804

Receiving TB from target UE
808

Transmitting PUSCH transmission
812

USER EQUIPMENT AGGREGATION FOR UPLINK COMMUNICATIONS

CROSS-REFERENCE TO RELATED APPLICATION

This application is a 371 U.S. National Phase of PCT International Patent Application No. PCT/CN2021/120496, filed Sep. 24, 2021, which is herein incorporated by reference in its entirety for all purposes.

BACKGROUND

Third Generation Partnership Project (3GPP) Technical Specifications (TSs) define standards for New Radio (NR) wireless networks. These TSs describe aspects related to user plane and control plane signaling over the networks.

DETAILED DESCRIPTION

Figure 1:
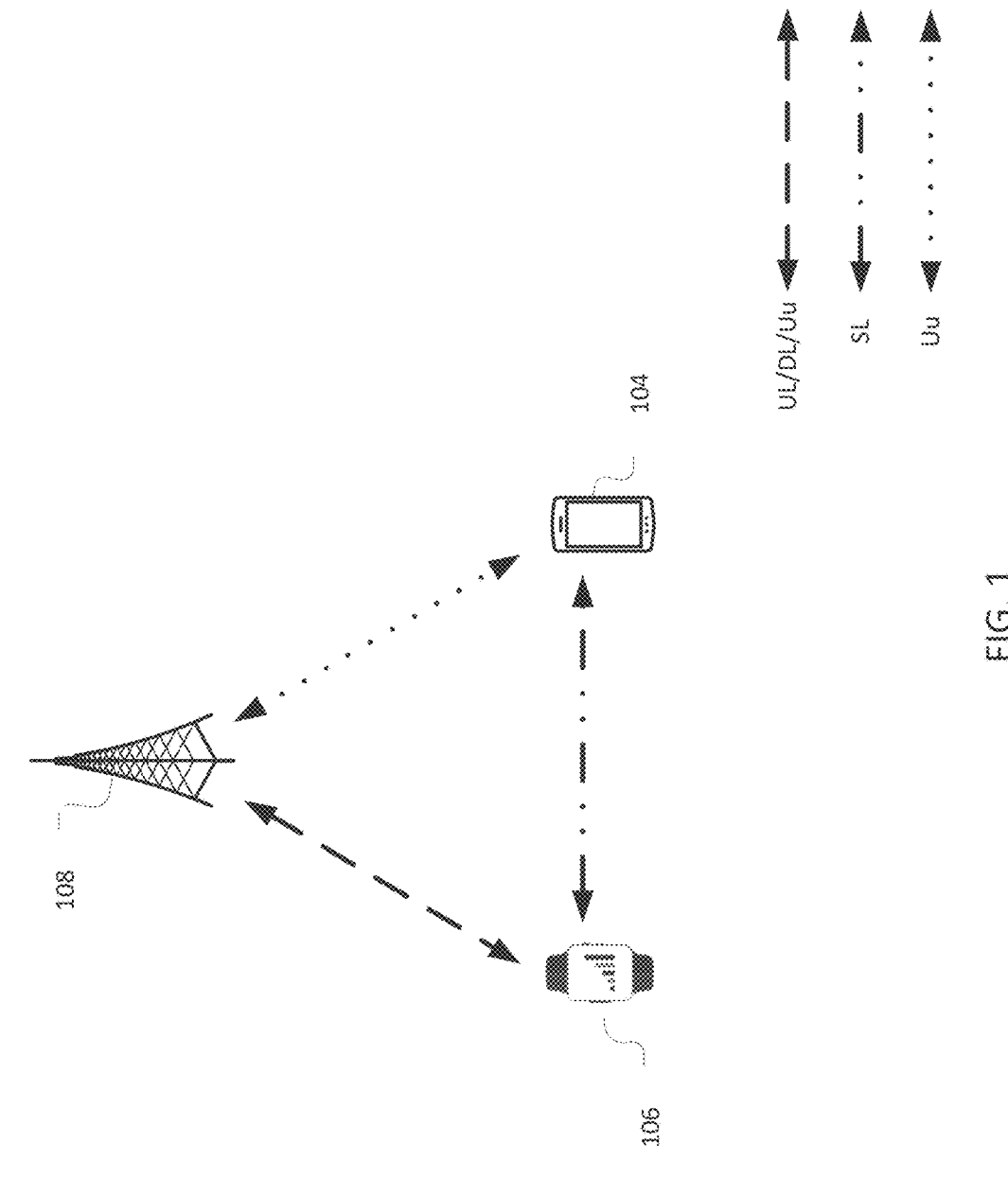
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include user equipments (UEs) 104 and 106 and a base station 108 of a radio access network (RAN). The base station 108 may be next generation node B (gNB) to provide one or more 5G New Radio (NR) cells to provide NR user plane and control plane protocol terminations toward the UEs 104/106.

The UEs 104/106 may be an aggregated group that cooperates to improve uplink or downlink communications. For example, the UEs 104/106 may operate as a virtual UE that includes more platform resources than the UEs 104/106 do individually. In this manner, the UE aggregation may provide more transmit power, antenna/RF chains, antenna diversity, etc.

The aggregated UEs may include a target UE and one or more assistant UEs. The uplink/downlink communications performed by the assistant UEs may be for the benefit of the target UE that is the source or destination of the communicated information. For embodiments described herein, the UE 104 may be considered the target UE and the UE 106 may be considered the assistant UE. However, these roles may be dynamic and may change over time. The target UE 104 and the assistant UE 106 may belong to the same user or may belong to different users. The target UE 104 is shown generally as a mobile phone, while the assistant UE 106 is shown generally as a smart watch. These depictions are not restrictive. In other embodiments, other types of UEs may be used as target/assistant UEs.

The UEs 104/106 and the base station 108 may communicate over air interfaces compatible with 3GPP TSs such as those that define Fifth Generation (5G) NR system standards. In some embodiments, the target UE 104 may communicate with the base station 108 over a Uu interface and may further communicate with the assistant UE 106 over a sidelink (SL) interface. The sidelink interface may be any type of wired or wireless interface. For example, the sidelink interface may be an interface of a wireless personal area network technology, a wireless local area network technology, or a wireless wide area network technology.

In some embodiments, the assistant UE 106 may be camped on a cell provided by the base station 108. In these embodiments, the assistant UE 106 may also communicate with the base station 108 over a Uu interface. In other embodiments, the assistant UE 106 may not be camped on a cell provided by the base station 108 and may, therefore, be hidden from the base station 108. In these embodiments, the assistant UE 106 may not be able to communicate with the base station 108 over an established Uu interface, but may still be configured to receive information from, or transmit information to, the base station 108 as will be described.

Figure 2:
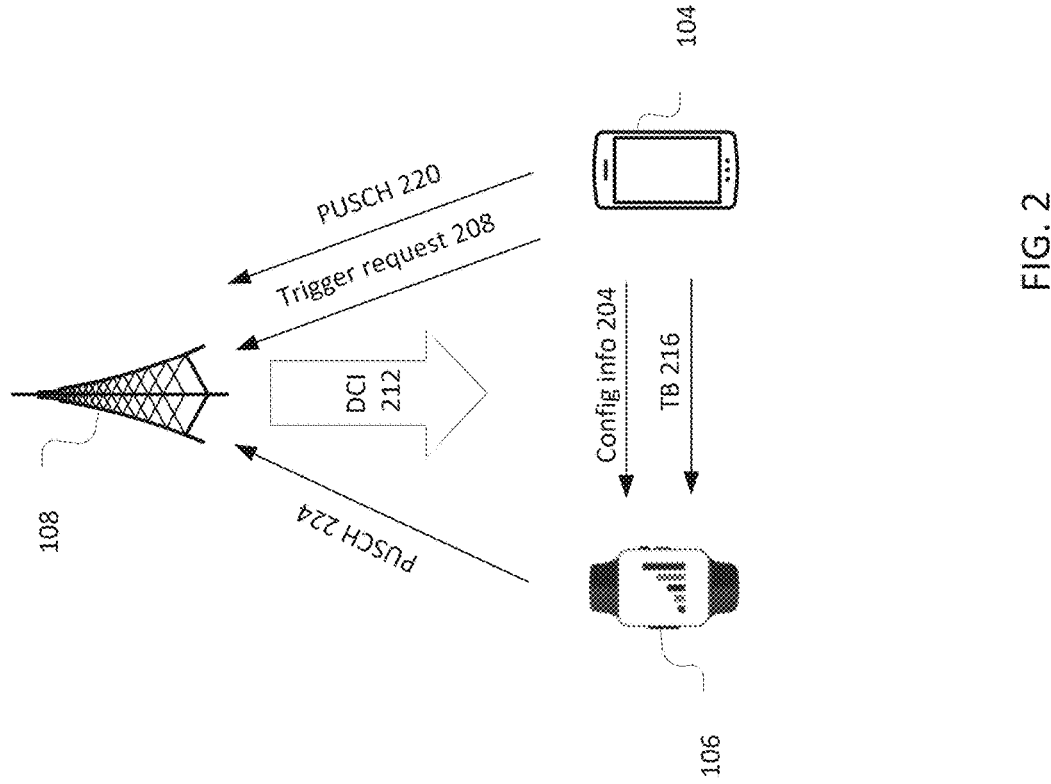
FIG. 2 illustrates a message flow in accordance with some embodiments.

FIG. 2 illustrates a message flow 200 in accordance with some embodiments. The message flow 200 may be performed in situations in which the assistant UEs are hidden from the base station 108. However, similar concepts may also be used in situations in which the assistant UEs are camped on a cell provided by the base station 108.

The target UE 104 may identify one or more assistant UEs, including the assistant UE 106, with which to form a UE aggregate. Various criteria may be used by the target UE 104 to identify the assistant UEs. The criteria may include UEs that belong to a common user. The criteria may additionally/alternatively include UEs that are within a predetermined range from the target UE 104 or have a predetermined sidelink quality with the target UE 104. The criteria may additionally/alternatively include UEs that have declared they are able to assist. This declaration may be through a physical sidelink shared channel (PSSCH) transmission, a sidelink-synchronization signal block (S-SSB) transmission, etc. The criteria may additionally/alternatively include UEs that are relatively stationary with respect to the target UE 104. For example, the target UE 104 may only select UEs as assistant UEs if they are expected to be within a predetermined proximity for a predetermined period of time. Thus, it may be desirable that the assistant UEs have a relatively low mobility with respect to the target UE 104. The criteria may additionally/alternatively include UEs that have sufficient processing capabilities. The processing capabilities may be, for example, transmit power, uplink/downlink processing power, a predetermined number of transmit or receive antennas, etc. In some embodiments, the target UE 104 may not select an assistant UE with processing capabilities that are below the capabilities of the target UE 14 itself. However, in some embodiments an assistant UE with processing capabilities less than the target UE 104 may still be selected by the target UE 104 and may be able to contribute by increasing, for example, spatial transmit diversity.

At 204, the target UE 104 may transmit configuration information to the assistant UE 106 over a sidelink channel. The configuration information may be information that is sufficient to enable the assistant UE 106 to decode downlink control information (DCI), transmitted from the base station 108 at 208, and to prepare a physical uplink shared channel (PUSCH) transmission to the base station 108 on behalf of the target UE 104. The configuration information may include radio network temporary identifiers (RNTIs), indications of configured/activated bandwidth parts (BWPs) upon which the target UE 104 is operating, physical downlink control channel (PDCCH) configurations, PUSCH configurations, expected time to receive downlink communications from the base station 108, a timing advance at the target UE 104, uplink power control parameters at the target UE 104, etc.

In some embodiments, instead of providing configuration information sufficient to allow the assistant UE 106 to decode the DCI, the target UE 104 may decode DCI transmitted by the base station and provide the configuration information as a set of information from the DCI that may be used to prepare the PUSCH transmission. For example, the configuration information transmitted in these embodiments may include resource allocation (for example, time or frequency domain resource allocation) of the PUSCH, uplink beam information, uplink power control information, etc.

In some embodiments, the configuration information transmitted at 204 may include one or more configuration messages. For example, some general uplink information may be provided initially and, subsequently, more specific information from a DCI that schedules a PUSCH transmission may be provided.

Providing sufficient configuration information to the assistant UE 106 to allow the assistant UE 106 to decode DCI may involve some signaling overhead but may also increase the chances that DCI will be decoded successfully by at least one of the aggregated UEs and may further reduce an amount of uplink processing time required between decoding the DCI and transmitting the scheduled PUSCH transmission as will be described in further detail below.

At 208, the target UE 104 may send a trigger request message to the base station 108 to request that an aggregation mode be activated. In some embodiments, the trigger request message may be uplink control information (UCI) that is transmitted in a physical uplink control channel (PUCCH) transmission, a special scheduling request (SR), or a special physical random access channel (PRACH) transmission.

In some embodiments, the trigger request message may simply include an indication of a request to enter (or exit from) the aggregation mode. In other embodiments, the trigger request message may additionally/alternatively include joint processing capabilities as described in further detail below or other information to facilitate operation in the aggregation mode.

At 212, the base station 108 may transmit DCI to schedule a PUSCH transmission. The DCI may be transmitted to the target UE 104, but also aiming to be received by the assistant UE 106. For example, the base station 108 may transmit the DCI based on a transmission configuration indicator provided by the target UE 104 in, for example, the trigger request 208. For another example, the base station 108 may transmit the DCI with a spatial beam that is wider than the spatial beam used for transmissions in the non-aggregation mode. The wider spatial beam may facilitate reception by both the target UE 104 and the assistant UE 106. In yet another example, the base station 108 may transmit multiple DCIs, with each DCI intended for a different UE of the aggregated UEs. These DCIs may be transmitted with different or common spatial beams.

At 216, the target UE 104 may forward the transport block to the assistant UE 106 over a sidelink channel. The target UE 104 may transmit the transport block to the base station 108 over a Uu interface in PUSCH transmission 220, and the assistant UE 106 may transmit the transport block to the base station 108 over the Uu interface in PUSCH transmission 224. The base station 108 may perceive the separate PUSCH transmission as one transmission, which may facilitate decoding and transmission efficiency.

In some embodiments, the PUSCH transmissions from the target UE 104 and the assistant UE 106 may be transmitted with a transmit beam based on a transmitted precoding matrix indicator (TPMI) or a sounding reference signal (SRS) indicator (SRI). The TPMI/SRI may be indicators that the target UE 104 suggests to the base station 108. Indications of the TPMI/SRI may be provided in the DCI that schedules the PUSCH transmission. The assistant UE 106 may obtain the TPM/SRI directly from the DCI or through configuration information transmitted by the target UE 104.

In some embodiments, the DCI transmitted by the base station 108 may indicate that the aggregation mode is activated. This indication may be implicit or explicit. An implicit indication may be provided based on a K2 value provided in the DCI. The K2 value may be a time domain resource assignment of the PUSCH. In particular, when the PDSCH subcarrier spacing is the same as PDCCH subcarrier spacing, K2 may provide the time delay, in number of slots, between the DCI slot and the PUSCH slot. If the K2 value is greater than a predetermined threshold (M), the target UE may determine that the DCI implicitly activates the aggregation mode. The predetermined threshold (M) may be provided to the network by the target UE 104 and may correspond to an amount of time required for joint uplink processing by the aggregated UEs. The predetermined threshold (M) may depend on capabilities of the aggregated UEs with respect to the joint uplink processing.

In some embodiments, the DCI may provide an explicit indication that the aggregation mode is activated by setting a bit value of an aggregation mode field within the DCI to activate the aggregation mode. For example, the aggregation mode field may be a one bit field in which a value of '1' indicates the aggregation mode is activated and the value of '0' indicates the aggregation mode is deactivated.

In some embodiments, the target UE 104 may transmit the transport block to a plurality of assistant UEs in a group-cast message. The group-cast message may be transmitted over a sidelink channel, for example, a PSSCH or a physical sidelink broadcast channel. In some embodiments, the group-cast message may further include some or all of the configuration information.

In some embodiments, the assistant UE 106 may receive downlink reference signals from the base station 108. The assistant UE 106 may perform an RSRP calculation based on the downlink reference signals. The RSRP calculation may serve as a basis for the assistant UE 106 determining or adjusting one or more uplink power control parameters. The uplink power control parameters may include PO value for the PUSCH (in dBm), an alpha value for the pathloss compensation coefficient, etc.

In some embodiments, the assistant UE 106 may adjust uplink parameters that are provided with respect to the target UE 104 in light of the related to the assistant UE 106. For example, the assistant UE 106 may receive, from the target UE 104 or the base station 108, a timing advance value. However, the timing advance value may be tailored to a distance between the target UE 104 and the base station 108. To the extent the assistant UE 106 has positioning assistance data, it may be able to adjust the timing advance value to a value that is more appropriate for a position of the assistant UE 106.

Figure 3:
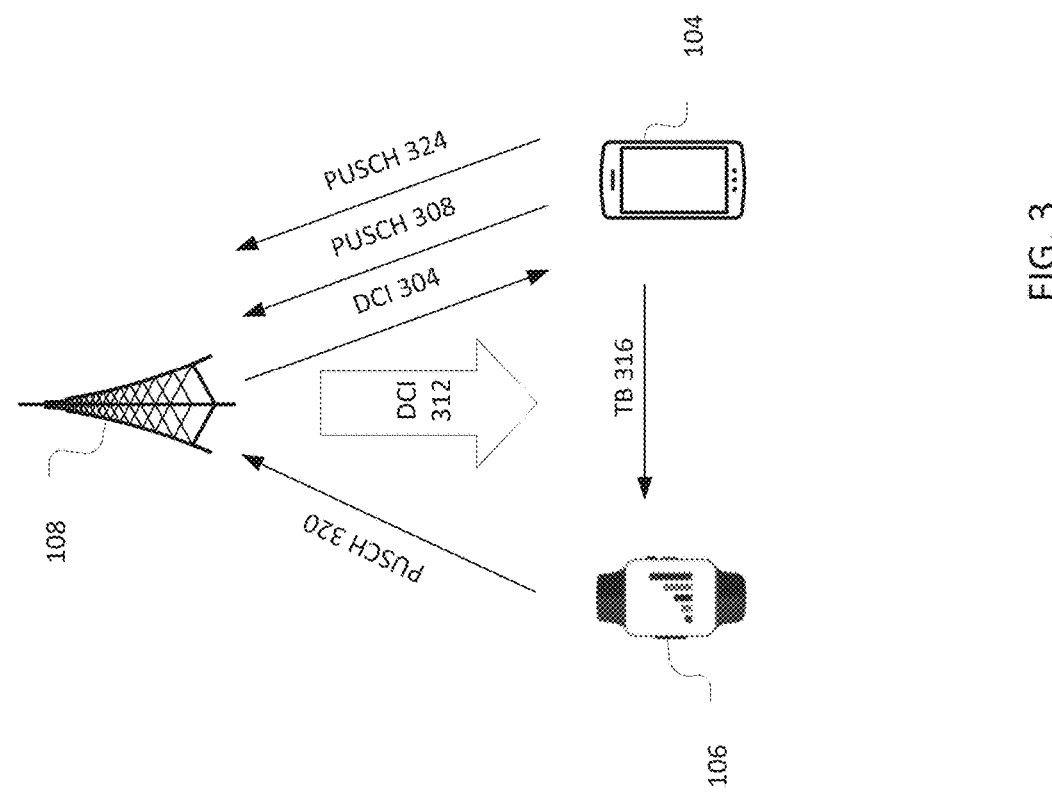
FIG. 3 illustrates another message flow in accordance with some embodiments.

Various combinations of initial/retransmission of the transport block coupled with dynamic activation of the aggregation mode may be contemplated by aspects of this disclosure. FIG. 3 illustrates a message flow 300 in which an aggregation mode is activated upon retransmission of a PUSCH in accordance with some embodiments. The message flow 300 may be performed in situations in which the assistant UEs are hidden from the base station 108. However, similar concepts may also be used in situations in which the assistant UEs are camped on a cell provided by the base station 108.

At 304, the base station 108 may transmit DCI to the target UE 104. The DCI may be targeted only to the target UE 104 and may schedule a PUSCH transmission. The target UE 104 may transmit the PUSCH transmission at 308. The PUSCH transmission at 308 may be performed without an aggregation mode. In the event the base station 108 fails to properly decode the PUSCH transmission, it may send DCI 312 to schedule another PUSCH transmission. The DCI 312 may be sent to accommodate reception at both the target UE 104 and the assistant UE 106 and may activate the aggregation mode. It may be noted that prior to this activation, the target UE 104 may have already indicated to the base station 108 that it is capable of performing the UL aggregation and may have also provide various uplink aggregation information, such as desired uplink/downlink beams, uplink joint processing time, etc.

The target UE 104 may pair with the assistant UE 106 and provide configuration information in a manner similar to that discussed above with respect to FIG. 2. In some embodiments, the configuration information may include information from the DCI 312 that is sufficient to enable the assistant UE 106 to transmit a PUSCH transmission.

The assistant UE 106 may receive transport block from the target UE 104 at 316. Thereafter, the assistant UE 106 may, at 320, transmit a PUSCH transmission with the transport block to the base station 108, and the target UE 104 may, at 324, transmit a PUSCH transmission 324 with the transport block to the base station 108. It may be noted that the timeline between the DCI 312 and the resources for PUSCH transmissions at 320 and 324 may be based on the information exchanged between the target UE 104 and the assistant UE 106 after receiving the DCI at 312.

Figure 4:
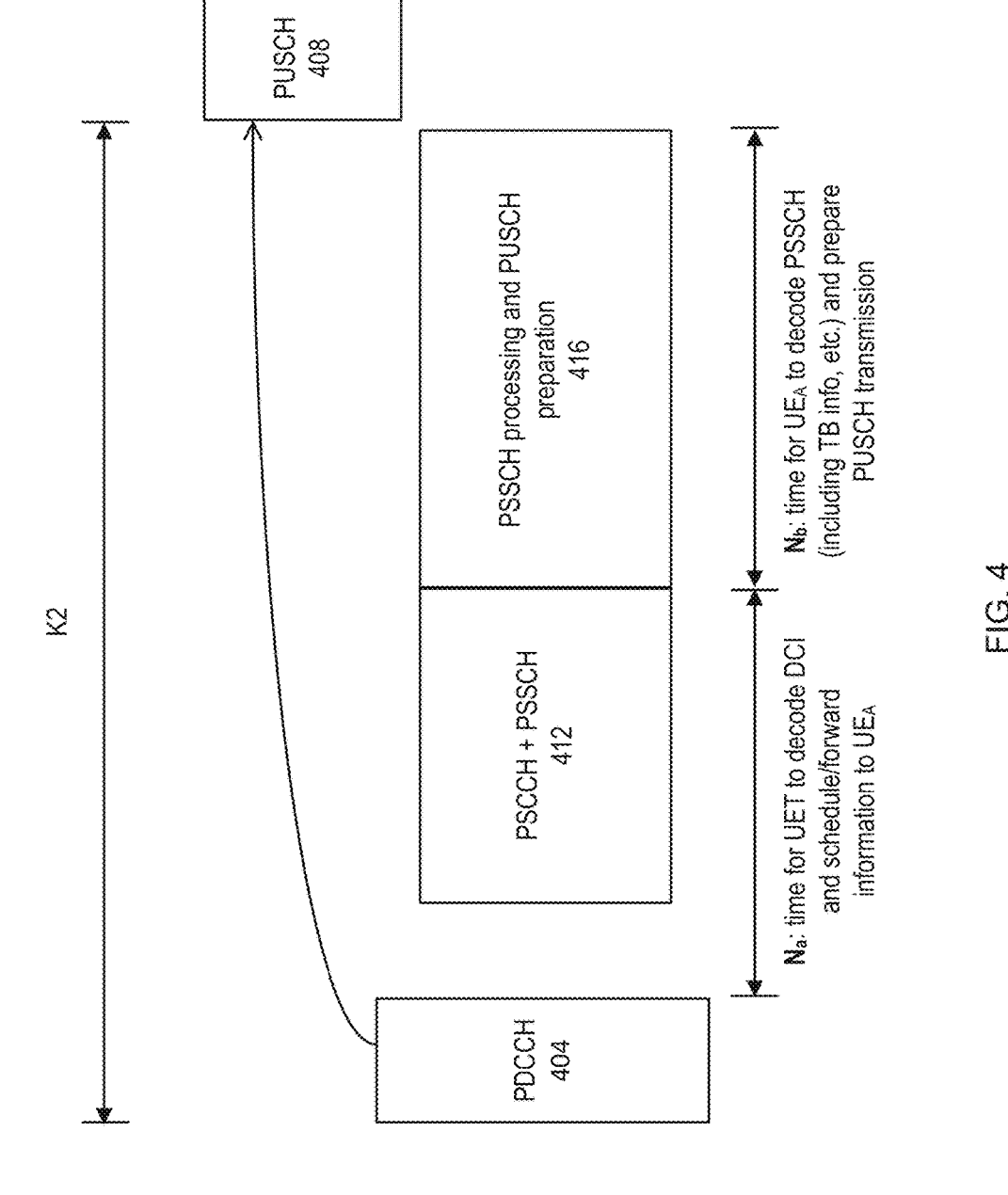
FIG. 4 illustrates a signaling diagram in accordance with some embodiments.

FIG. 4 illustrates a signaling diagram 400 to demonstrate timeline considerations with respect to uplink aggregation in accordance with some embodiments. The signaling diagram 300 illustrates a PDCCH 404 that may be received by the target UE 104. The PDCCH 404 may include DCI that schedules resources for a PUSCH 408. In some embodiments, the DCI may also activate the aggregation mode. The DCI may have a K2 value that provides a time between the PDCCH slot and the PUSCH slot.

Two time periods may be considered. A first time period, $N_a$, may refer to the time that it takes the target UE 104 $(UE_T)$ to decode DCI in the PDCCH 404 and schedule/forward information to the assistant UE 106 $(UE_A)$. This time period may include time for both PSCCH and PSSCH transmissions 412 that are involved in transmitting relevant information to the assistant UE 106. A second time period, $N_b$, may include the time that it takes for the assistant UE 106 $(UE_A)$ to decode the PSSCH that includes the transport block, configuration information, etc. and prepare the PUSCH transmission 416. The target UE 104 may expect that the K2 value provides sufficient time for the operations of the first and second time periods to complete before the allocation for the PUSCH 408. For example, $K2 >= N_a + N_b$.

The amount of time for each of the first and second time periods may be based on processing capabilities of the target UE 104 and the assistant UE 106 as well as the type of configuration information transmitted. For example, if the target UE 104 initially provides sufficient configuration information to allow the assistant UE 106 to decode the DCI in the PDCCH 404, less configuration information may need to be communicated between the aggregated UEs and the $N_a/N_b$ periods will be smaller. In some embodiments, the target UE 104 may provide an indication of joint processing capabilities to the base station 108 to ensure the proper scheduling of the PUSCH resources. The joint processing capabilities may include uplink/sidelink processing capabilities of the aggregated UEs and may also include information as to the type of configuration information provided to the assistant UEs.

As discussed above, in some of the embodiments both the target UE 104 and the assistant UE 106 may be camped on a cell provided by the base station 108. In these embodiments, the base station may provide a more active role in establishing the UE aggregation and communicating with the assistant UEs. For example, assisted UEs may be selected by the target UE 104 as described above. However, the target UE 104 may then transmit a suggestion to the base station 108 of the UEs to be included as assistant UEs. In other embodiments, the base station 108 may select the UEs to be included as the assistant UEs. This may allow for UEs that are not already in an established communication with one another to participate in a UE aggregation.

For the uplink aggregation, the base station 108 may activate the aggregation mode using group common-DCI (GC-DCI). The GC-DC may be similar to the unicast DCI described above (with FDRA, K2, etc.), but may also include a list of UE identifiers corresponding to the aggregated UEs. The first UE identifier in the list of identifiers may identify the target UE 104 that will source the transport block for the PUSCH transmissions. The remaining identifiers in the list may correspond to assistant UEs. Thus, by receiving the GC-DCI, each of the aggregated UEs will know the source of the transport block and the role the UE is to play in the aggregation (for example, as an assistant or a target).

At least some of the parameters included in the DCI may apply to transmissions from all the aggregated UEs. For example, the FDRA and K2 values may apply broadly. In some embodiments, some fields may be repeated to a number of the aggregated UEs. In this manner, specific values (for example, TPMI/SRI, TPC, etc.) may be provided for specific aggregated UEs. In this manner, all of the aggregated UEs, after applying individual parameters (for example, timing advances, power control parameters, etc.), may transmit PUSCH transmissions at the K2 time indicated by the GC-DCI.

In some embodiments, different DCIs may be transmitted to different aggregated UEs for scheduling the same transport block on the uplink. This option may be associated with a relatively higher overhead, but may also provide some additional flexibility/reliability.

In embodiments in which the assistant UEs are camped on a cell provided by the base station 108, the base station 108 may control the majority of the aggregation operations and the target UE 104 may simply share the transport block information to the assistant UEs.

Figure 5:
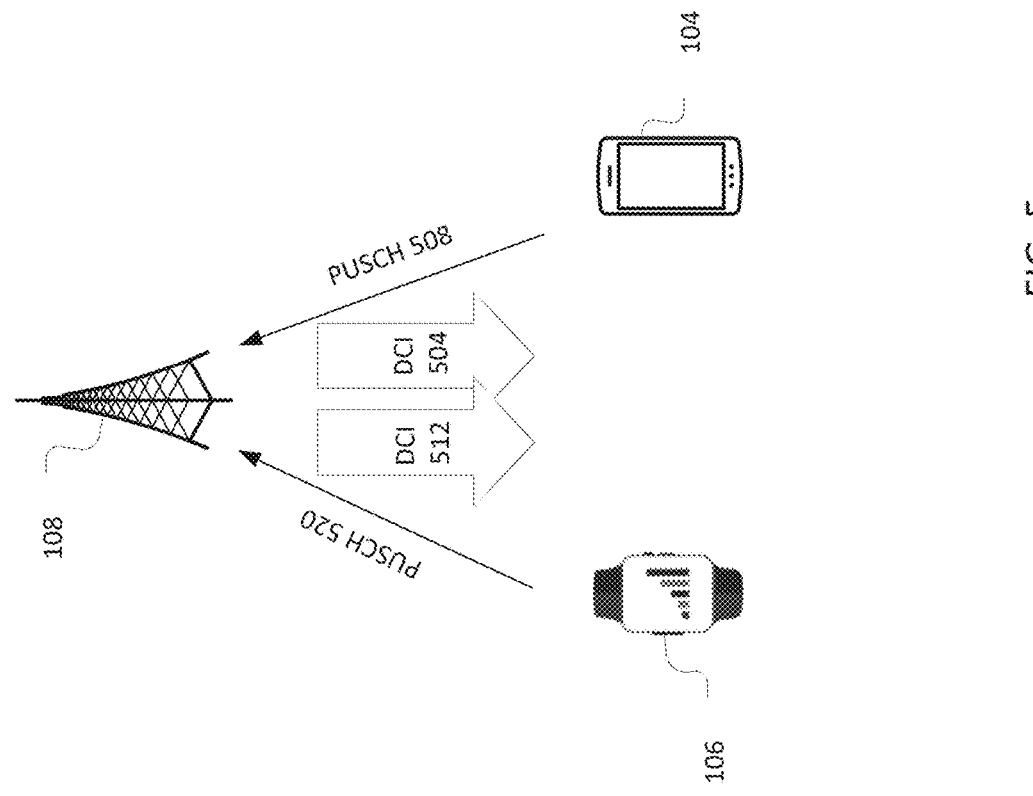
FIG. 5 illustrates another message flow in accordance with some embodiments.

FIG. 5 illustrates a message flow 500 in accordance with some embodiments. The signaling diagram 500 may be used in embodiments in which the assistant UE 106 is camped on a cell provided by the base station 108.

At 504, the base station 108 may transmit DCI 504 to activate an aggregation mode and to schedule a PUSCH transmission. The DCI 504 may be transmitted in manner to facilitate reception by both the target UE 104 and the assistant UE 106. However, in this embodiments, the DCI 504 may indicate that the transmit UE 106 is to transmit the PUSCH transmission and the assistant UE 106 is to receive.

At 508, the UE 104 may transmit the PUSCH 508 scheduled by the DCI 504 on the Uu interface. The assistant UE 106 may be configured and enabled to receive the PUSCH 508 transmitted on the Uu interface. In the event the base station 108 fails to decode the PUSCH transmission 508, it may send another DCI at 512 to indicate that the assistant UE 106 (and possibly the target UE 104 as well) are to perform the uplink transmission. The assistant UE 106 may then transmit the PUSCH, received from the target UE 104 at 508, to the base station 108 at 520.

In this embodiment, the timeline between the DCI at 512 and the PUSCH at 520 may be relatively short, as the assistant UE 106 may have previously received the transport block from the UE 104.

In some embodiments, the process for providing the transport block from the target UE 104 to the assistant UE 106 may be dynamically configured. For example, in some instances, the base station may instruct the aggregated UEs to perform an SL transfer of the transport block (for example, target UE 104 to provide the transport block to the assistant UE 106 of a sidelink interface) or a Uu transfer of the transport block (for example, the target UE 104 to provide the transport block to the assistant UE 106 over the Uu interface). The base station may indicate the transfer process explicitly or implicitly. An explicit indication of the transfer process may be provided through RRC signaling or dynamically indicated in DCI. An implicit indication of the transfer process may be provided through a value of K2 being within a predetermined range.

Figure 6:
FIG. 6 illustrates an operation flow/algorithmic structure in accordance with some embodiments.
Figure 6:
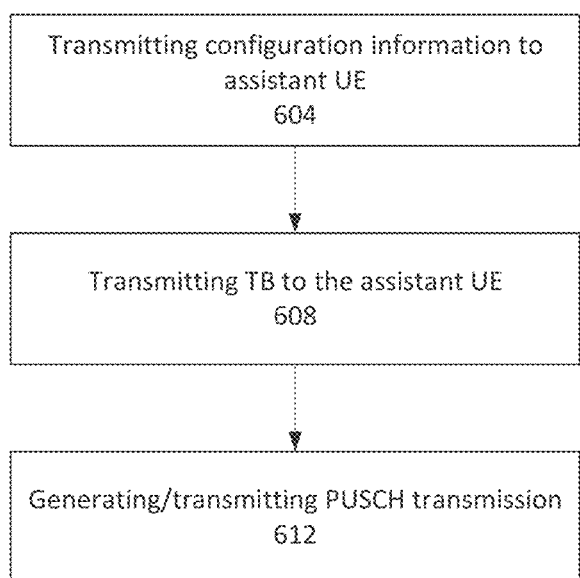

FIG. 6 provides an operation flow/algorithmic structure 600 in accordance with some embodiments. The operation flow/algorithmic structure 600 may be performed/implemented by a UE such as, for example, target UE 104 or UE 900 or by components thereof, for example, processors 904.

The operation flow/algorithmic structure 600 may include, at 604, transmitting configuration information to an assistant UE. In some embodiments, the configuration information may be information sufficient to allow the assistant UE to decode DCI that schedules PUSCH transmissions and generate/transmit the PUSCH transmission to a base station. In other embodiments, the implementing UE may decode DCI and provide the configuration information based on the decoded DCI. In these embodiments, the configuration information may be information sufficient to enable the assistant UE to generate/transmit the PUSCH transmission to the base station. In various embodiments, the configuration information may include various uplink and downlink configuration parameters that define timing/frequency resource allocations, power control parameters, etc.

The operation flow/algorithmic structure 600 may further include, at 608, transmitting a transport block to the assistant UE. In some embodiments, the transport block may be transmitted to the assistant UE over a sidelink interface. If the UE aggregation includes more than one assistant UE, the transport block may be transmitted in a multicast message.

The operation flow/algorithmic structure 600 may further include, at 612, generating/transmitting the PUSCH transmission. The PUSCH transmission may include the transport block that was sent to the assistant UE.

In some embodiments, the transport block may be transmitted to the assistant UE over a Uu interface (for example as part of a PUSCH transmission to the base station). Thus, in these embodiments, operations 608 and 612 may be the same operations.

Figure 7:
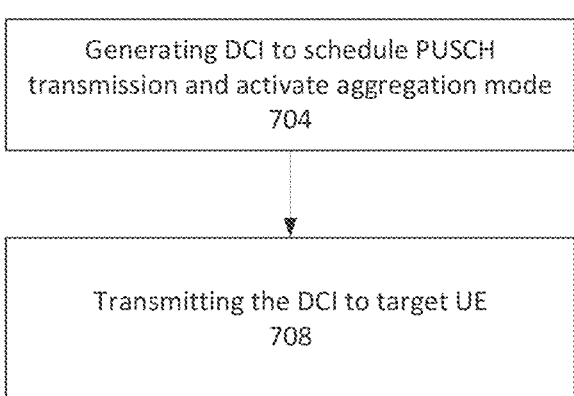
FIG. 7 illustrates another operation flow/algorithmic structure in accordance with some embodiments.

FIG. 7 provides an operation flow/algorithmic structure 700 in accordance with some embodiments. The operation flow/algorithmic structure 700 may be performed/implemented by a base station such as, for example, base station 108 or base station 1000 or by components thereof, for example, processors 1004.

The operation flow/algorithmic structure 700 may include, at 704, generating DCI to schedule a PUSCH transmission and activate an aggregation mode. The aggregation mode may be activated for a plurality of aggregated UEs including a target UE and an assistant UE. When operating under the activated aggregation mode, the assistant UE may coordinate an uplink transmission with the target UE.

In some embodiments, the DC may be generated with an explicit or implicit indication of the activation of the aggregation mode. An explicit indication may include setting a bit and an aggregation mode field to indicate that the aggregation mode is activated. An implicit indication may include providing a K2 value in the DCI that is sufficient to allow for joint processing operations by the aggregated UEs.

In some embodiments, the base station may generate the DCI to include the K2 value to accommodate the joint processing operations. This may be based on feedback from the target UE that provides UE capability information (including sidelink and uplink processing capabilities for the target UE and the assistant UE) and, potentially, information regarding the type of configuration information provided to the assistant UE.

In some embodiments, the DCI may be GC-DCI that includes a list of UE identifiers that correspond to the aggregated UEs. An order of the list UE may indicate which UE is the target UE and which UEs are the assistant UEs. The GC-DCI may include one or more common or specific parameters that may be used by the aggregated UEs for coordinating the uplink transmission.

The operation flow/algorithmic structure 700 may further include, at 708, transmitting the DCI to the target UE. In some embodiments, the DCI may be transmitted to the target UE but may also have properties to facilitate receipt by one or more assistant UEs. In some embodiments, separate DCI may be generated and transmitted to separate UEs of the aggregated UEs.

Figure 8:
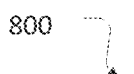
FIG. 8 illustrates another operation flow/algorithmic structure in accordance with some embodiments.
Figure 8:
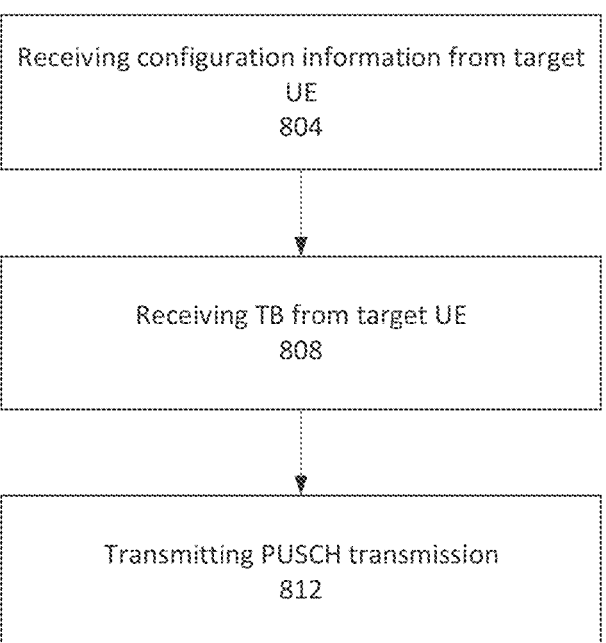

FIG. 8 provides an operation flow/algorithmic structure 800 in accordance with some embodiments. The operation flow/algorithmic structure 800 may be performed/implemented by an assistant UE such as, for example, assistant UE 106 or UE 900 or by components thereof, for example, processors 904.

The operation flow/algorithmic structure 800 may include, at 804, receiving configuration information from a target UE. The configuration information may include various information to allow the assistant UE to generate and transmit PUSCH transmissions. In some embodiments, the configuration information may also allow the assistant UE to decode DCI from the base station.

The operation flow/algorithmic structure 800 may further include, at 808, receiving a transport block from a target UE. In some embodiments, the transport block may be received over a sidelink interface. In other embodiments, the transport block may be received over a Uu interface.

The operation flow/algorithmic structure 800 may further include, at 812, transmitting PUSCH transmission. The PUSCH transmission may include the transport block provided at 808. In some embodiments, the PUSCH transmission may be transmitted in response to the configuration information provided by the target UE. In other embodiments, the assistant UE may delay transmission of the PUSCH transmission until receiving a DCI from the base station that requests transmission.

Figure 9:
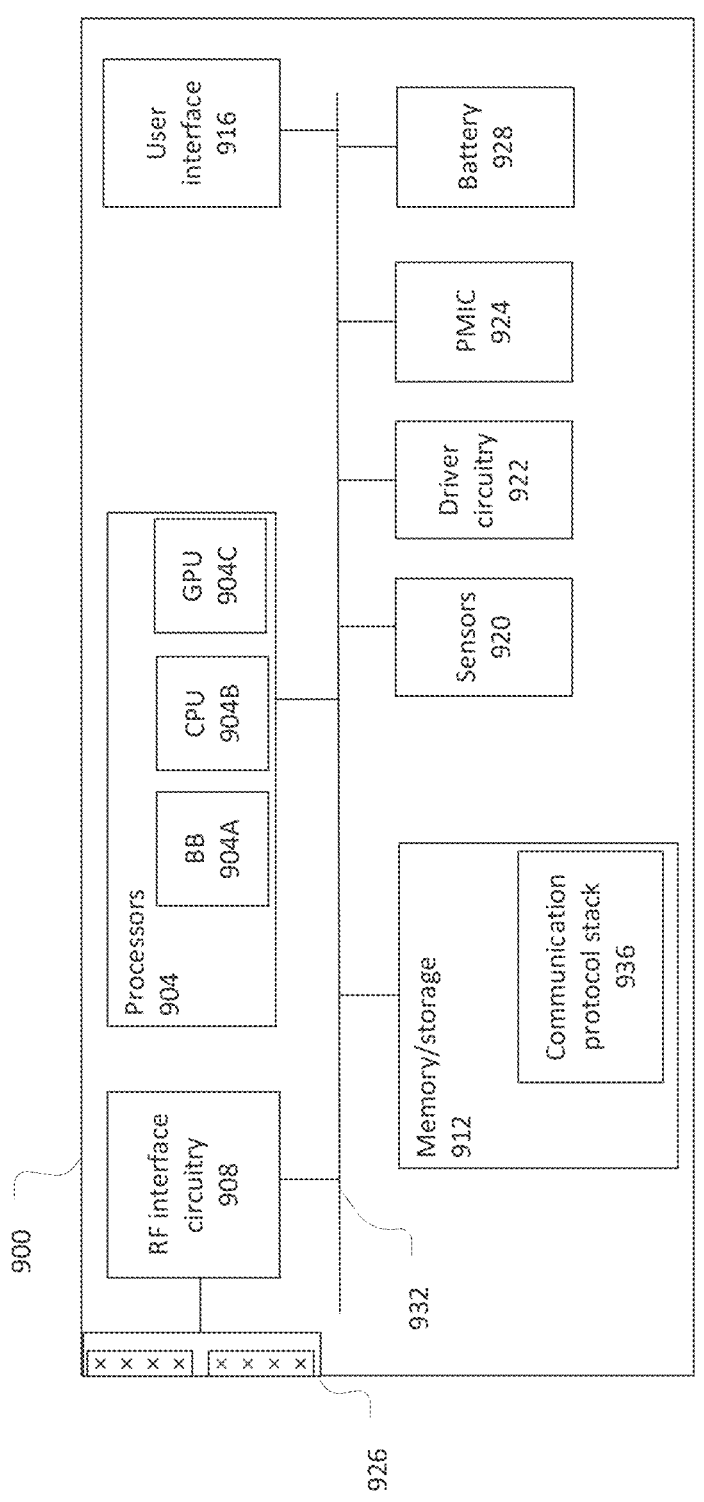
FIG. 9 illustrates a user equipment in accordance with some embodiments.

FIG. 9 illustrates a UE 900 in accordance with some embodiments. The UE 900 may be similar to and substantially interchangeable with target UE 104 or assistant UE UE 106.

The UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 900 may include processors 904. RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, or optical connection that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack 936 to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a NAS layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 912 may include one or more non-transitory, computer-readable media that includes instructions (for example, communication protocol stack 936) that may be executed by one or more of the processors 904 to cause the UE 900 to perform various operations described herein. The memory/storage 912 include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR and sidelink access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include microstrip antennas, printed antennas fabricated on the surface of one or more printed circuit boards, patch antennas, or phased array antennas. The antenna 926 may have one or more panels designed for specific frequency bands including bands in FR1 or FR2.

The user interface circuitry 916 includes various input/output (I/O) devices designed to enable user interaction with the UE 90. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 922 may include software and hardware elements that operate to control particular devices that are embedded in the UE 900, attached to the UE 900, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
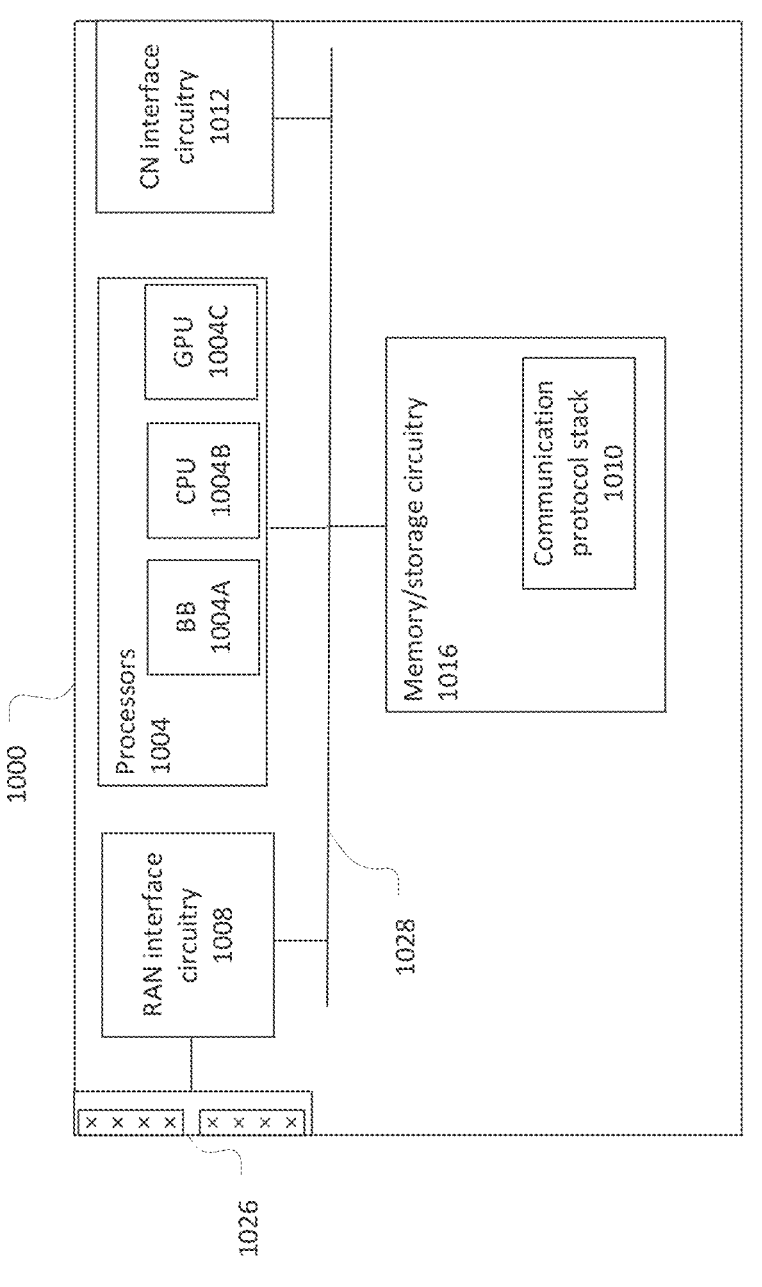
FIG. 10 illustrates a base station in accordance with some embodiments.

FIG. 10 illustrates a base station 1000 in accordance with some embodiments. The base station 1000 may be similar to and substantially interchangeable with base station 108.

The base station 1000 may include processors 1004, RF interface circuitry 1008 (if implemented as a base station), core network (CN) interface circuitry 1012, memory/storage circuitry 1016, and antenna structure 1026 (if implemented as a base station).

The components of the base station 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 8.

The CN interface circuitry 1012 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the base station 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

In some embodiments, the base station 1000 may be coupled with transmit receive points (TRPs) using the antenna structure 1026, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method of operating a target user equipment (UE), the method comprising: transmitting configuration information to an assistant UE to facilitate coordination of uplink transmissions; transmitting, to the assistant UE, a transport block to be transmitted to a base station, generating a physical uplink shared channel (PUSCH) transmission to include the transport block; and transmitting the PUSCH transmission to the base station.

Example 2 includes the method of example 1 or some other example herein, wherein the configuration information is to enable the assistant UE to decode downlink control information from the base station.

Example 3 includes the method of example 2 or some other example herein, wherein the configuration information comprises: a timing advance at the target UE, uplink power control parameters at the target UE, a PUSCH configuration, a bandwidth part configuration, or a physical downlink control channel (PDCCH) configuration.

Example 4 includes the method of example 1 or some other example herein, further comprising: decoding downlink control information (DCI) from the base station to obtain a frequency-domain or time-domain resource allocation for the PUSCH transmission, wherein the configuration information includes the resource allocation; and transmitting the configuration information to the assistant UE using a physical sidelink control channel (PSCCH) or a physical sidelink shared channel (PSSCH).

Example 5 includes the method of example 1 or some other example herein, further comprising: transmitting, to the base station, a request to enter an aggregation mode, wherein the request comprises a scheduling request, a physical random access channel transmission, or uplink control information.

Example 6 includes the method of example 1 or some other example herein, further comprising: decoding downlink control information (DCI) from the base station; and determining, based on the DCI, that an aggregation mode is activated.

Example 7 includes the method of example 6 or some other example herein, further comprising: determining, based on the DCI, that a K2 value is larger than a predetermined threshold; and determining, based on the K2 value being larger than the predetermined threshold, that the aggregation mode is activated.

Example 8 includes the method of example 1 or some other example herein, further comprising: transmitting the transport block in a groupcast message to a plurality of assistant UEs, including the assistant UE, via a physical sidelink shared channel.

Example 9 includes the method of example 1 or some other example herein, wherein the PUSCH transmission is a retransmission of the transport block and the method further comprises: transmitting an initial transmission of the transport block in a non-aggregation mode; and receiving downlink control information (DCI) to trigger the retransmission and activation of an aggregation mode.

Example 10 includes the method of example 1 or some other example herein, further comprising: transmitting, to the base station, an indication of sidelink and uplink processing capabilities of the target UE and the assistant UE.

Example 11 includes a method of operating a base station, the method comprising: generating a downlink control information (DCI) to schedule a physical uplink shared channel (PUSCH) transmission and to activate an aggregation mode for aggregated user equipments (UEs) that include a target user equipment (UE) and an assistant UE; and transmitting the DCI to the target UE.

Example 12 includes the method of example 11 or some other example herein, further comprising: receiving an indication of sidelink and uplink processing capabilities of the target UE and the assistant UE; and transmitting the DCI to schedule the PUSCH transmission a period of time after the DCI, wherein the period of time is based on the sidelink and uplink processing capabilities of the target UE and the assistant UE.

Example 13 includes the method of example 11 or some other example herein, wherein generating the DCI to activate the aggregation mode comprises: generating the DCI to include a value within an aggregation mode field to activate the aggregation mode; or generating the DCI to schedule the PUSCH transmission a period of time after the DCI, wherein the period of time is at least equal to a threshold period of time to allow for joint uplink processing of the target UE and the assistant UE.

Example 14 includes the method of example 11 or some other example herein, wherein the DCI is a group common-DCI (GC-DCI) that includes a list of a plurality of UE identifiers that respectively correspond to a plurality of aggregated UEs, wherein a first UE identifier occurring in the list of the plurality of UE identifiers corresponds to the target UE.

Example 15 includes the method of example 14 or some other example herein, wherein the GC-DCI includes one or more uplink transmission parameters common to the plurality of aggregated UEs, the one or more uplink transmission parameters including a K2 value and a frequency domain resource allocation of resources for the PUSCH transmission.

Example 16 includes the method of example 15 or some other example herein, wherein the GC-DCI includes a first set of uplink transmission parameters for the target UE and a second set of uplink transmission parameters for the assistant UE, wherein: the first set of uplink transmission parameters includes a first transmit power control command, a first transmitted precoding matrix indicator (TPMI), or a first sounding reference signal (SRS) indicator, and the second set of uplink transmission parameters includes a second transmit power control command, a second transmitted precoding matrix indicator (TPMI), or a second sounding reference signal (SRS) indicator.

Example 17 includes the method of example 11 or some other example herein, wherein the DCI is first DCI and the method further comprises: determining the PUSCH transmission is not successfully received from the target UE; and transmitting second DCI to request transmission of the PUSCH transmission from the assistant UE.

Example 18 includes the method of example 11 or some other example herein, further comprising: providing, to the target UE, an indication of whether to transmit a transport block to the assistant UE via a sidelink interface or a Uu interface, wherein the indication is an explicit indication in radio resource control signaling or DCI signaling or is an implicit indication based on a K2 value within the DCI.

Example 19 includes a method of operating an assistant user equipment (UE), the method comprising: receiving configuration information from a target UE; receiving a transport block from the target UE; and transmitting a physical uplink shared channel (PUSCH) transmission that includes the transport block based on the configuration information.

Example 20 includes the method of example 19 or some other example herein, further comprising: determining, based on the configuration information or downlink control information, a transmitted precoding matrix indicator (TPMI) or a sounding reference signal (SRS) indicator; and transmitting the PUSCH transmission with a transmit beam based on the TPMI or the SRS indicator.

Example 21 includes the method of example 19 or some other example herein, further comprising: receiving, based on the configuration information, a downlink reference signal from the base station; determining one or more uplink power control parameters based on the downlink reference signal; and transmitting the PUSCH transmission using the one or more uplink power control parameters.

Example 22 includes the method of example 19 or some other example herein, wherein the configuration information comprises a timing advance at the target UE and the method further comprises: determining, based on positioning information of the assistant UE, a timing advance at the assistant UE; and transmitting the PUSCH transmission based on the timing advance at the assistant UE.

Example 23 includes the method of example 19 or some other example herein, wherein the PUSCH transmission is a first PUSCH transmission and the method further comprises: receiving the transport block from the target UE in a second PUSCH transmission on a Uu interface; receiving downlink control information (DCI) from a base station after receiving the transport block from the target UE, the DCI to request transmission of the first PUSCH transmission; and transmitting the first PUSCH transmission based on the DCI.

Example 24 may include an apparatus comprising means to perform one or more elements of a method described in or related to any of examples 1-23, or any other method or process described herein.

Example 25 may include one or more non-transitory computer-readable media comprising instructions to cause an electronic device, upon execution of the instructions by one or more processors of the electronic device, to perform one or more elements of a method described in or related to any of examples 1-23, or any other method or process described herein.

Example 26 may include an apparatus comprising logic, modules, or circuitry to perform one or more elements of a method described in or related to any of examples 1-23, or any other method or process described herein.

Example 27 may include a method, technique, or process as described in or related to any of examples 1-23, or portions or parts thereof.

Example 28 may include an apparatus comprising: one or more processors and one or more computer-readable media comprising instructions that, when executed by the one or more processors, cause the one or more processors to perform the method, techniques, or process as described in or related to any of examples 1-23, or portions thereof.

Example 29 may include a signal as described in or related to any of examples 1-23, or portions or parts thereof.

Example 30 may include a datagram, information element, packet, frame, segment, PDU, or message as described in or related to any of examples 1-23, or portions or parts thereof, or otherwise described in the present disclosure.

Example 31 may include a signal encoded with data as described in or related to any of examples 1-23, or portions or parts thereof, or otherwise described in the present disclosure.

Example 32 may include a signal encoded with a datagram, IE, packet, frame, segment, PDU, or message as described in or related to any of examples 1-23, or portions or parts thereof, or otherwise described in the present disclosure.

Example 33 may include an electromagnetic signal carrying computer-readable instructions, wherein execution of the computer-readable instructions by one or more processors is to cause the one or more processors to perform the method, techniques, or process as described in or related to any of examples 1-23, or portions thereof.

Example 34 may include a computer program comprising instructions, wherein execution of the program by a processing element is to cause the processing element to carry out the method, techniques, or process as described in or related to any of examples 1-23, or portions thereof.

Example 35 may include a signal in a wireless network as shown and described herein.

Example 36 may include a method of communicating in a wireless network as shown and described herein.

Example 37 may include a system for providing wireless communication as shown and described herein.

Example 38 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
generating, for transmission to a base station, an indication of sidelink and uplink processing capabilities of a target user equipment (UE) and an assistant UE;
generating configuration information for transmission to the assistant UE to facilitate coordination of uplink transmissions;
outputting a transport block for transmission to the base station indirectly via the assistant UE;
generating a physical uplink shared channel (PUSCH) transmission to include the transport block; and
outputting the PUSCH transmission for transmission to the base station directly over a Uu interface.

2. The method of claim 1, wherein the configuration information is to enable the assistant UE to decode downlink control information from the base station.

3. The method of claim 2, wherein the configuration information comprises: a timing advance at a target UE, uplink power control parameters at a target UE, a PUSCH configuration, a bandwidth part configuration, or a physical downlink control channel (PDCCH) configuration.

4. The method of claim 1, further comprising:
decoding downlink control information (DCI) from the base station to obtain a frequency-domain or time-domain resource allocation for the PUSCH transmission,
wherein the configuration information includes the frequency-domain or time-domain resource allocation; and
transmitting the configuration information to the assistant UE using a physical sidelink control channel (PSCCH) or a physical sidelink shared channel (PSSCH).

5. The method of claim 1, further comprising:
transmitting, to the base station, a request to enter an aggregation mode, wherein the request comprises a scheduling request, a physical random access channel transmission, or uplink control information.

6. The method of claim 1, further comprising:

decoding downlink control information (DCI) from the base station; and determining, based on the DCI, that an aggregation mode is activated.

7. The method of claim 6, further comprising:

determining, based on the DCI, that a K2 value is larger than a predetermined threshold; and determining, based on the K2 value being larger than the predetermined threshold, that the aggregation mode is activated.

8. The method of claim 1, further comprising:

transmitting the transport block in a groupcast message to a plurality of assistant UEs, including the assistant UE, via a physical sidelink shared channel.

9. The method of claim 1, wherein the PUSCH transmission is a retransmission of the transport block and the method further comprises:

transmitting an initial transmission of the transport block in a non-aggregation mode; and receiving downlink control information (DCI) to trigger the retransmission and activation of an aggregation mode.

10. A method comprising:

generating downlink control information (DCI) to schedule a physical uplink shared channel (PUSCH) transmission and to activate an aggregation mode for a target user equipment (UE) and an assistant UE, wherein the aggregation mode enables the target UE to transmit a transport block via both a direct path to a base station and an indirect path to the base station via the assistant UE; and outputting the DCI for transmission to the target UE, wherein generating the DCI to activate the aggregation mode includes:

generating the DCI to include a value within an aggregation mode field to activate the aggregation mode; or generating the DCI to schedule the PUSCH transmission a period of time after the DCI, wherein the period of time is at least equal to a threshold period of time to allow for joint uplink processing of the target UE and the assistant UE.

11. The method of claim 10, further comprising:

receiving an indication of sidelink and uplink processing capabilities of the target UE and the assistant UE, wherein the DCI is to schedule the PUSCH transmission a period of time after the DCI and the period of time is based on the sidelink and uplink processing capabilities of the target UE and the assistant UE.

12. The method of claim 10, wherein the DCI is a group common-DCI (GC-DCI) that includes a list of a plurality of UE identifiers that respectively correspond to a plurality of aggregated UEs, wherein a first UE identifier occurring in the list of the plurality of UE identifiers corresponds to the target UE.

13. The method of claim 12, wherein the GC-DCI includes one or more uplink transmission parameters common to the plurality of aggregated UEs, the one or more uplink transmission parameters including a K2 value and a frequency domain resource allocation of resources for the PUSCH transmission.

14. The method of claim 13, wherein the GC-DCI includes a first set of uplink transmission parameters for the target UE and a second set of uplink transmission parameters for the assistant UE, wherein:

the first set of uplink transmission parameters includes a first transmit power control command, a first transmitted precoding matrix indicator (TPMI), or a first sounding reference signal (SRS) indicator; and the second set of uplink transmission parameters includes a second transmit power control command, a second transmitted precoding matrix indicator (TPMI), or a second sounding reference signal (SRS) indicator.

15. The method of claim 10, wherein the DCI is first DCI and the method further comprises:

determining the PUSCH transmission is not successfully received from the target UE; and generating second DCI for transmission to the assistant UE to request transmission of the PUSCH transmission.

16. The method of claim 10, further comprising:

outputting, for transmission to the target UE, an indication of whether to transmit a transport block to the assistant UE via a sidelink interface or a Uu interface, wherein the indication is an explicit indication in radio resource control signaling or DCI signaling or is an implicit indication based on a K2 value within the DCI.

17. One or more non-transitory, computer-readable media having instructions that, when executed, cause processing circuitry to:

receive configuration information from a target UE;

receive a transport block from the target UE;

determine, based on the configuration information or downlink control information, a transmitted precoding matrix indicator (TPMI) or a sounding reference signal (SRS) indicator; and output, for transmission to a base station, a physical uplink shared channel (PUSCH) transmission that includes the transport block, the PUSCH transmission output with a transmit beam based on the TPMI or the SRS indicator.

* * * * *